R. G. EMERSON.
Bee Hive.
No. 38,475.
Patented May 12, 1863.
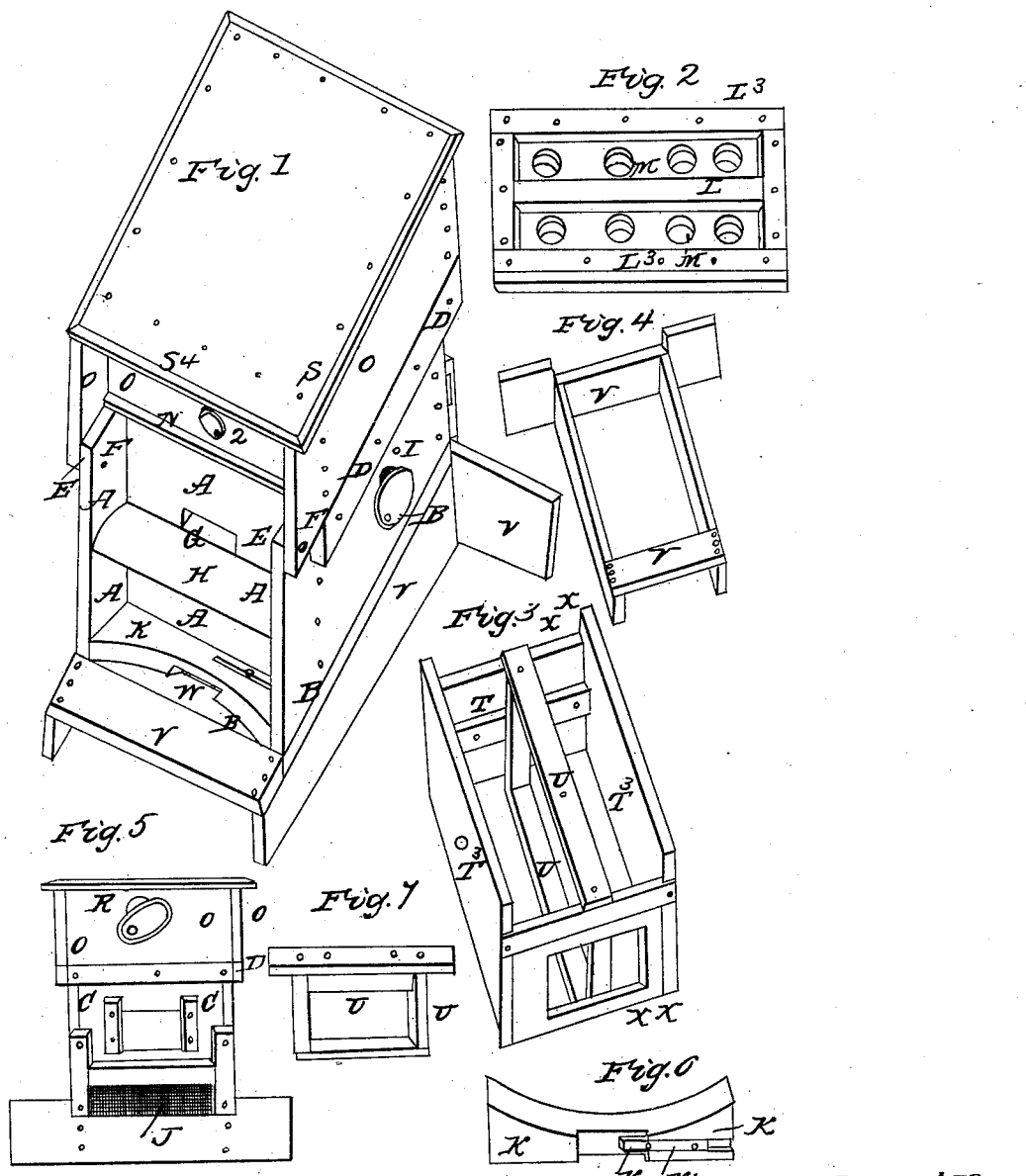

UNITED STATES PATENT OFFICE.

RUFUS G. EMERSON, OF FAIR HAVEN, ILLINOIS.

IMPROVEMENT IN BEE-HIVES.

Specification forming part of Letters Patent No. 38,475, dated May 12, 1863.

*To all whom it may concern:*

Be it known that I, RUFUS G. EMERSON, of Fair Haven Township, in the county of Carroll, in the State of Illinois, have invented an Improvement for Bee-Hives; and I do hereby declare that the following is a full and exact description thereof, reference being had to the accompanying drawings, and to the letters of reference marked thereon.

The nature of my invention consists in providing a bee-hive with a block or strip of wood in the front, at or near the bottom of the hive, the block being concave in front, and having a sliding bar working in a groove in the block to govern the opening where the bees enter and leave the hive.

To enable others skilled in the art to make and use my invention, I will proceed to describe its construction and operation.

I construct a block or strip, of wood or other suitable materials, of an oblong form, but concave in front, as shown at K, Figures 1 and 6, to reach across the lower part in the front of a bee-hive, having a sliding bar, as at K in Fig. 6, working in a groove, $K^2$, Fig. 6, within the block to regulate the opening where the bees have ingress and egress to and from the hive, or to close it entirely, as the temperature of the weather may require.

This invention can be applied to almost any hive now in use, and can be attached to the hive by screws, or in any other convenient manner, and the sliding bar can be operated by the hand till the aperture is of the size desired.

What I claim as my invention, and desire to secure by Letters Patent, is—

The application to bee-hives of a concave block or strip of wood, or other materials, constructed with an internal groove and sliding bar, substantially as delineated, and for for the purpose specified.

RUFUS G. EMERSON.

Witnesses:
  T. T. JACOBS,
  W. H. HARRIS.